United States Patent
Tiramani et al.

(10) Patent No.: US 10,829,029 B2
(45) Date of Patent: Nov. 10, 2020

(54) CUSTOMIZABLE TRANSPORTABLE STRUCTURES AND COMPONENTS THEREFOR

(71) Applicant: Build IP LLC, Las Vegas, NV (US)

(72) Inventors: Paolo Tiramani, Las Vegas, NV (US); Kyle Denman, North Las Vegas, NV (US)

(73) Assignee: Build IP LLC, Las Vegas, NV (US)

( * ) Notice: Subject to any disclaimer, the term of this patent is extended or adjusted under 35 U.S.C. 154(b) by 0 days.

(21) Appl. No.: 16/804,473

(22) Filed: Feb. 28, 2020

(65) Prior Publication Data
US 2020/0198520 A1 Jun. 25, 2020

Related U.S. Application Data

(62) Division of application No. 16/143,598, filed on Sep. 27, 2018, now Pat. No. 10,688,906.
(Continued)

(51) Int. Cl.
*E04B 1/343* (2006.01)
*E04B 1/344* (2006.01)
(Continued)

(52) U.S. Cl.
CPC .............. *B60P 3/40* (2013.01); *B60G 9/00* (2013.01); *B62B 5/0086* (2013.01); *E04B 1/19* (2013.01);
(Continued)

(58) Field of Classification Search
CPC ..... E04B 1/02; E04B 1/04; E04B 1/08; E04B 1/10; E04B 1/12; E04B 1/14; E04B 1/16;
(Continued)

(56) References Cited

U.S. PATENT DOCUMENTS 1,498,173 A * 6/1924 Kelley .................. E04B 1/3444
52/69
2,070,924 A 2/1937 Derman
(Continued)

FOREIGN PATENT DOCUMENTS

CA 2442403 C 12/2008
DE 19800291 A1 7/1999
(Continued)

OTHER PUBLICATIONS topsider.com/floorF.html—believed available as submitted herewith by May 13, 2008.
(Continued)

*Primary Examiner* — Kyle J. Walraed-Sullivan
(74) *Attorney, Agent, or Firm* — McCarter & English, LLP

(57) ABSTRACT

A wall component and other components for a building structure wherein the wall component has a spanning beam spanning the length of the wall component, one or more structural column assemblies positioned between the spanning beam and a floor plate which are structured to carry structural weights and loads received from the spanning beam. The structural column assemblies are separated by a longitudinal distance so as to define an intercolumnar region which is greater than a width of a member selected from the group consisting of a door assembly and a window assembly, and there is an exterior panel fastened between the first and second structural column assemblies that defines a generally continuous and uninterrupted planar surface over the intercolumnar region.

19 Claims, 11 Drawing Sheets

Related U.S. Application Data

(60) Provisional application No. 62/567,579, filed on Oct. 3, 2017, provisional application No. 62/568,491, filed on Oct. 5, 2017.

(51) Int. Cl.
| | |
|---|---|
| *B60P 3/40* | (2006.01) |
| *B62B 5/00* | (2006.01) |
| *B60G 9/00* | (2006.01) |
| *E04B 1/19* | (2006.01) |
| *E04G 21/14* | (2006.01) |
| *B60P 1/64* | (2006.01) |
| *B62D 63/08* | (2006.01) |
| *B60G 9/02* | (2006.01) |
| *B62D 53/06* | (2006.01) |
| *E04B 1/00* | (2006.01) |
| *E04B 2/56* | (2006.01) |

(52) U.S. Cl.
CPC ........ *E04B 1/3445* (2013.01); *E04B 1/34357* (2013.01); *B60G 9/02* (2013.01); *B60G 2200/44* (2013.01); *B60G 2300/38* (2013.01); *B60G 2300/402* (2013.01); *B60P 1/6445* (2013.01); *B62D 53/067* (2013.01); *B62D 63/08* (2013.01); *E04B 2001/0076* (2013.01); *E04B 2001/199* (2013.01); *E04B 2001/1984* (2013.01); *E04B 2002/567* (2013.01); *E04G 21/14* (2013.01)

(58) Field of Classification Search
CPC .......... E04B 1/162; E04B 1/167; E04B 1/168; E04B 1/24; E04B 1/34357; E04B 1/3445; E04B 1/34321; E04B 2/56; E04B 2/562; E04B 2/58; E04B 2/70; E04B 2/703; E04B 2/707; E04B 2/7401; E04B 2/7403; E04B 2/7407; E04B 2/76; E04B 2001/327; E04B 2001/2496; E04B 2002/567; E04B 7/107; E04B 1/34373; E04B 1/34384; E04B 1/3441; E04B 1/343; E04B 1/3442; E04B 1/3444; E04B 1/34336; E04B 2002/8694; E04B 2001/34389; E04C 2003/0491; B60P 3/34; E04H 2001/1283; B62D 63/061
USPC ...................... 52/79.5, 71; 135/143
See application file for complete search history.

(56) References Cited

U.S. PATENT DOCUMENTS

| | | | |
|---|---|---|---|
| 2,126,511 A | 8/1938 | Soule | |
| 2,302,101 A | 11/1942 | Boydstun | |
| 2,644,203 A | 7/1953 | Donahue | |
| 2,704,223 A * | 3/1955 | Houdart | B60P 3/34 |
| | | | 296/26.13 |
| 2,780,843 A * | 2/1957 | De Sherbinin | E04B 1/3444 |
| | | | 52/69 |
| 2,832,637 A * | 4/1958 | Decosse | B60P 3/34 |
| | | | 296/26.15 |
| 2,883,713 A | 4/1959 | Zug | |
| 2,904,849 A * | 9/1959 | Bergstrom | E04B 1/343 |
| | | | 52/79.5 |
| 2,904,850 A * | 9/1959 | Couse | B60P 3/341 |
| | | | 52/36.2 |
| 2,920,920 A * | 1/1960 | Couse | E04B 1/3442 |
| | | | 296/26.02 |
| 2,933,055 A * | 4/1960 | Couse | E04B 1/3442 |
| | | | 52/63 |
| 3,044,129 A | 7/1962 | Bigelow | |
| 3,097,400 A * | 7/1963 | Davis et al. | E04B 1/3442 |
| | | | 52/70 |
| 3,107,116 A * | 10/1963 | Meaker | B60P 3/34 |
| | | | 296/171 |
| 3,147,024 A | 9/1964 | Brockman | |
| 3,280,796 A | 10/1966 | Hatcher | |
| 3,305,993 A | 2/1967 | Nels | |
| 3,324,831 A | 6/1967 | St. Onge | |
| 3,341,987 A * | 9/1967 | Johansson | E04B 1/3445 |
| | | | 52/70 |
| 3,465,488 A | 9/1969 | Miller | |
| 3,469,356 A * | 9/1969 | White | B60P 3/34 |
| | | | 52/71 |
| 3,550,334 A | 12/1970 | Van Der Lely | |
| 3,611,659 A | 10/1971 | Greenlaugh | |
| 3,624,786 A | 11/1971 | Lundahl | |
| 3,631,999 A | 1/1972 | Walerowski | |
| 3,694,977 A | 10/1972 | Verman | |
| 3,712,007 A | 1/1973 | Kump | |
| 3,720,022 A | 3/1973 | Dattner | |
| 3,750,366 A | 8/1973 | Rich, Jr. et al. | |
| 3,793,796 A | 2/1974 | Hughes | |
| 3,828,502 A | 8/1974 | Carlsson | |
| 3,844,063 A | 10/1974 | Jackson | |
| RE28,367 E | 3/1975 | Rich, Jr. et al. | |
| 3,983,665 A | 10/1976 | Burton | |
| 4,035,964 A | 7/1977 | Robinson | |
| 4,068,434 A | 1/1978 | Day et al. | |
| 4,118,901 A | 10/1978 | Johnson | |
| 4,155,204 A | 5/1979 | Prozinski | |
| 4,165,591 A | 8/1979 | Fitzgibbon | |
| 4,235,054 A | 11/1980 | Cable et al. | |
| 4,441,286 A | 4/1984 | Skvaril | |
| 4,464,877 A | 8/1984 | Gebhardt et al. | |
| 4,534,141 A * | 8/1985 | Fagnoni | E04B 1/3444 |
| | | | 52/68 |
| 4,567,699 A | 2/1986 | McClellan | |
| 4,599,829 A | 7/1986 | DiMartino, Sr. | |
| 4,603,518 A | 8/1986 | Fennes | |
| 4,603,658 A | 8/1986 | Gamsey | |
| 4,635,412 A | 1/1987 | Le Poittevin | |
| 4,641,468 A | 2/1987 | Slater | |
| 4,644,708 A | 2/1987 | Baudot et al. | |
| 4,674,250 A | 6/1987 | Altizer | |
| 4,689,924 A * | 9/1987 | Jurgensen | E04B 1/3444 |
| | | | 52/67 |
| 4,744,182 A | 5/1988 | Shacket et al. | |
| 4,766,708 A | 8/1988 | Sing | |
| 4,779,514 A | 10/1988 | Prigmore et al. | |
| 4,780,996 A | 11/1988 | Julien, Jr. | |
| 4,856,244 A | 8/1989 | Clapp | |
| 4,890,437 A | 1/1990 | Quaile | |
| 4,891,919 A | 1/1990 | Palibroda | |
| 4,958,874 A | 9/1990 | Hegedus | |
| 4,958,974 A | 9/1990 | Schenk | |
| 4,989,379 A | 2/1991 | Suzuki | |
| 5,070,667 A | 12/1991 | Schulte | |
| 5,185,973 A * | 2/1993 | Oldani | B60P 3/34 |
| | | | 52/143 |
| 5,218,803 A | 6/1993 | Wright | |
| 5,265,394 A | 11/1993 | Gardner | |
| 5,345,730 A * | 9/1994 | Jurgensen | E04B 1/3444 |
| | | | 52/64 |
| 5,491,934 A | 2/1996 | Bigelow, Jr. et al. | |
| 5,596,844 A | 1/1997 | Kalinowski | |
| 5,657,606 A | 8/1997 | Ressel et al. | |
| 5,664,388 A | 9/1997 | Chapman et al. | |
| 5,732,839 A * | 3/1998 | Schimmang | E04B 1/34305 |
| | | | 220/1.5 |
| 5,755,063 A | 5/1998 | Ohnishi et al. | |
| 5,761,854 A * | 6/1998 | Johnson | B60P 3/34 |
| | | | 135/116 |
| 5,765,330 A | 6/1998 | Richard | |
| 5,867,963 A | 2/1999 | Hershey | |
| 5,899,037 A | 5/1999 | Josey | |
| 5,906,075 A | 5/1999 | Sowers | |
| 5,950,373 A | 9/1999 | von Hoff et al. | |
| 5,966,956 A * | 10/1999 | Morris | F25D 11/003 |
| | | | 52/69 |
| 6,003,278 A | 12/1999 | Weaver et al. | |

(56) References Cited

U.S. PATENT DOCUMENTS

| | | | |
|---|---|---|---|
| 6,003,919 A * | 12/1999 | Shook | B60P 3/34 296/26.14 |
| 6,047,519 A | 4/2000 | Bagn | |
| 6,073,413 A | 6/2000 | Tongiatama | |
| 6,158,184 A | 12/2000 | Timmerman, Sr. et al. | |
| 6,185,898 B1 | 2/2001 | Pratt | |
| 6,195,950 B1 | 3/2001 | Harris | |
| 6,223,479 B1 * | 5/2001 | Stockli | E04B 1/3442 52/126.1 |
| 6,244,016 B1 | 6/2001 | Wolf | |
| 6,279,284 B1 | 8/2001 | Moras | |
| 6,308,469 B1 | 10/2001 | Leung | |
| 6,385,942 B1 | 5/2002 | Grossman et al. | |
| 6,481,172 B1 | 11/2002 | Porter | |
| 6,625,937 B1 | 9/2003 | Parker et al. | |
| 6,745,531 B1 | 6/2004 | Egan | |
| 6,925,761 B1 | 8/2005 | De La Marche | |
| 6,941,718 B1 | 9/2005 | diGirolamo et al. | |
| 6,959,514 B1 | 11/2005 | Pingel | |
| 6,959,515 B1 | 11/2005 | Beighton | |
| 6,983,567 B2 * | 1/2006 | Ciotti | E04B 1/3442 52/64 |
| 6,997,495 B1 * | 2/2006 | Groezinger | B60P 3/025 296/26.15 |
| 7,299,596 B2 | 11/2007 | Hildreth | |
| 7,326,022 B2 | 2/2008 | Brown et al. | |
| 7,444,953 B1 | 11/2008 | Player | |
| 7,740,257 B2 | 6/2010 | Haire | |
| 7,828,367 B2 * | 11/2010 | Hickam | B60P 3/34 296/156 |
| 7,841,136 B2 * | 11/2010 | Czyznikiewicz | E04B 1/3444 52/64 |
| 7,882,659 B2 | 2/2011 | Gyory et al. | |
| 7,930,857 B2 | 4/2011 | Pope | |
| 8,141,304 B2 | 3/2012 | Shen et al. | |
| 8,166,715 B2 | 5/2012 | De Azambuja | |
| 8,276,328 B2 | 10/2012 | Pepin | |
| 8,347,560 B2 | 1/2013 | Gyory et al. | |
| 8,474,194 B2 | 7/2013 | Tiramani | |
| 8,516,778 B1 | 8/2013 | Wilkens | |
| 8,733,029 B2 | 5/2014 | Tiramani | |
| 8,925,270 B2 | 1/2015 | Grisolia et al. | |
| D820,469 S * | 6/2018 | Watson | D25/22 |
| 2001/0004820 A1 | 6/2001 | Poliquin | |
| 2002/0046514 A1 | 4/2002 | Leung | |
| 2002/0095896 A1 | 7/2002 | Commins et al. | |
| 2002/0179598 A1 * | 12/2002 | Kuhn | E04B 1/3444 220/1.5 |
| 2003/0009964 A1 | 1/2003 | Trarup et al. | |
| 2003/0071426 A1 | 4/2003 | Larouche | |
| 2004/0108750 A1 * | 6/2004 | Park | B60P 3/39 296/156 |
| 2004/0128930 A1 | 7/2004 | Ohnishi | |
| 2004/0139674 A1 | 7/2004 | DiLorenzo | |
| 2004/0148889 A1 | 8/2004 | Bibee et al. | |
| 2004/0177581 A1 | 9/2004 | Starke | |
| 2005/0055973 A1 | 3/2005 | Hagen et al. | |
| 2005/0066620 A1 | 3/2005 | Albora | |
| 2005/0076600 A1 | 4/2005 | Moody et al. | |
| 2005/0122014 A1 * | 6/2005 | Bucher | E04B 1/3431 312/311 |
| 2005/0283371 A1 | 12/2005 | Tiramani | |
| 2006/0037256 A1 | 2/2006 | Pryor | |
| 2006/0070306 A1 * | 4/2006 | Lin | E04B 1/3444 52/67 |
| 2006/0137269 A1 | 6/2006 | Di Lorenzo | |
| 2006/0150573 A1 | 7/2006 | Elliott et al. | |
| 2007/0051069 A1 | 3/2007 | Grimes | |
| 2007/0079573 A1 * | 4/2007 | Sarine | E04B 1/34305 52/592.1 |
| 2007/0096473 A1 | 5/2007 | Ortega | |
| 2007/0144078 A1 * | 6/2007 | Frondelius | E04B 1/34305 52/67 |
| 2007/0170740 A1 * | 7/2007 | Di Franco | B60P 3/34 296/26.13 |
| 2007/0209294 A1 * | 9/2007 | Harvey | E04B 1/3448 52/79.1 |
| 2008/0264463 A1 * | 10/2008 | Kim | B60P 3/34 135/148 |
| 2009/0014044 A1 * | 1/2009 | Hartman | E04B 1/3445 135/143 |
| 2009/0193734 A1 | 8/2009 | Harig et al. | |
| 2009/0217600 A1 * | 9/2009 | De Azambuja | B60P 3/34 52/79.5 |
| 2010/0018130 A1 * | 1/2010 | Lopez | E04B 1/3445 52/71 |
| 2010/0162636 A1 * | 7/2010 | Bonebrake | E04B 1/34305 52/79.5 |
| 2010/0192481 A1 * | 8/2010 | Shen | E04B 1/3444 52/79.5 |
| 2010/0269419 A1 * | 10/2010 | Gyory | E04B 1/3444 52/79.5 |
| 2011/0094167 A1 * | 4/2011 | Noiseux | E04B 1/3444 52/79.5 |
| 2011/0126479 A1 * | 6/2011 | Alford | E04B 1/3442 52/79.5 |
| 2011/0297675 A1 * | 12/2011 | Johnson | B60P 3/14 220/8 |
| 2012/0006369 A1 * | 1/2012 | Cantin | E04B 1/3444 135/96 |
| 2012/0137610 A1 | 6/2012 | Knight et al. | |
| 2012/0240501 A1 | 9/2012 | Spiegel | |
| 2012/0255240 A1 * | 10/2012 | Shen | E04B 1/34807 52/79.5 |
| 2012/0317902 A1 | 12/2012 | Kapteyn | |
| 2013/0067841 A1 | 3/2013 | Grieco et al. | |
| 2013/0081346 A1 | 4/2013 | Kulprathipanja et al. | |
| 2013/0232902 A1 | 9/2013 | Mayer et al. | |
| 2013/0263527 A1 * | 10/2013 | Barrett | E04H 15/008 52/79.1 |
| 2013/0269267 A1 | 10/2013 | Tiramani | |
| 2013/0283618 A1 | 10/2013 | Wiliams | |
| 2013/0305626 A1 * | 11/2013 | Strickland | E04B 1/34384 52/79.5 |
| 2013/0326986 A1 | 12/2013 | Krivtsov et al. | |
| 2014/0001786 A1 * | 1/2014 | Cantin | E04B 1/3442 296/26.14 |
| 2014/0115991 A1 | 5/2014 | Sievers et al. | |
| 2014/0150352 A1 * | 6/2014 | Lee | E04B 1/3444 52/2.22 |
| 2014/0202089 A1 * | 7/2014 | Nakajima | E04H 3/28 52/79.5 |
| 2014/0311051 A1 * | 10/2014 | Fagan | E04B 1/34384 52/79.5 |
| 2015/0093535 A1 * | 4/2015 | Lambach | E04B 1/10 428/71 |
| 2015/0135623 A1 | 5/2015 | Garrett et al. | |
| 2015/0204068 A1 | 7/2015 | Miller | |
| 2015/0361653 A1 | 12/2015 | Grant et al. | |
| 2016/0059104 A1 * | 3/2016 | Monaco | B60P 3/14 280/30 |
| 2016/0069062 A1 * | 3/2016 | Dynon | E04B 1/34815 52/79.5 |
| 2016/0138258 A1 * | 5/2016 | Schaffert | E04B 1/34357 52/79.5 |
| 2016/0208479 A1 | 7/2016 | Krause | |
| 2017/0030071 A1 * | 2/2017 | Sorensen | E04B 1/3442 |
| 2017/0037637 A1 | 2/2017 | Grisolia et al. | |
| 2017/0268232 A1 | 9/2017 | Renke et al. | |
| 2017/0350114 A1 * | 12/2017 | Crozier | E04B 1/34336 |
| 2018/0016781 A1 | 1/2018 | Fox et al. | |
| 2018/0112394 A1 | 4/2018 | Giles | |
| 2018/0148923 A1 | 5/2018 | Bravo Valenzuela | |

(56) References Cited

U.S. PATENT DOCUMENTS

2019/0161964 A1    5/2019    Figueroa
2020/0002552 A1*  1/2020    Song .................. C08K 3/38

FOREIGN PATENT DOCUMENTS

| | | |
|---|---|---|
| DE | 19631647 C2 | 4/2000 |
| GB | 2290567 A | 1/1996 |
| WO | 86/04630 A1 | 8/1986 |
| WO | 2002066755 A1 | 8/2002 |

OTHER PUBLICATIONS

Ching, Building Construction Illustrated (3d edition), Wall Systems 5.03, believed available as submitted herewith by Oct. 3, 2006.

BOCA 1999 (14th edition), p. 267, believed available as submitted herewith by Oct. 3, 2006.

Portion of www.thisoldhouse.com, believed available as submitted herewith by Aug. 2, 2006.

Pages 1 and 2 of //www.taunton.com/finehomebuilding/pages/h00023.asp, believed available as submitted herewith by Aug. 2, 2006.

Affidavit of Robert Delorenzo dated Oct. 3, 2006.

Decision on Appeal, Ex Parte Paolo Tiramani, Appeal 2010-008385, U.S. Appl. No. 10/653,523, dated Aug. 28, 2012.

International Search Report & Written Opinion, dated Jan. 2, 2019, in PCT/US2018/053006. (15 Pages).

U.S. Appl. No. 16/143,598, filed Sep. 27, 2018, Paolo Tiramani et al.

U.S. Appl. No. 16/786,130, filed Feb. 10, 2020, Paolo Tiramani et al.

U.S. Appl. No. 16/786,202, filed Feb. 10, 2020, Paolo Tiramani et al.

U.S. Appl. No. 16/786,315, filed Feb. 10, 2020, Paolo Tiramani et al.

U.S. Appl. No. 15/931,768, filed May 14, 2020, Paolo Tiramani et al.

Tom Moore, PE, "SIP's: An Engineer's Perspective", Powerpoint presented by the Structural Insulated Panel Association, 2018.

APA Product Guide—Structural Insulated Panels, printed 2018.

Structural Insulated Panels Association, "Designing With SIP's: Design Considerations", printed 2018.

Picture from https://microshowcase.com/microdwell/minim-house/.

http://heavytimbers.com/sips.html.

L1019-Genuine-Parts-Flyer, attached—Air Springs.

Hendrickson—Trailer Air Springs—Hendrickson Genuine Parts, attached.

International Search Report & Written Opinion, dated Jan. 29, 2019 in corresponding PCT application No. PCT/US2018/053015.

International Search Report and Written Opinion from International Patent Application No. PCT/US2020/017524 dated Jul. 30, 2020.

\* cited by examiner

CUSTOMIZABLE TRANSPORTABLE STRUCTURES AND COMPONENTS THEREFOR

CROSS-REFERENCE TO RELATED APPLICATIONS

This application is a divisional application of U.S. Nonprovisional patent application Ser. No. 16/143,598, filed Sep. 27, 2018, which claims the benefit of U.S. Provisional Application No. 62/567,579, filed Oct. 3, 2017, and claims the benefit of U.S. Provisional Application No. 62/568,491, filed Oct. 5, 2017.

BACKGROUND OF THE INVENTION

Field of the Invention

This invention relates to customizable transportable structures, components therefor, and a system for constructing structures using those components, such as dwellings and other buildings for residential occupancy, commercial occupancy and/or material storage.

Description of the Related Art

In the field of residential housing, the traditional technique for building homes is referred to as "stick-built" construction, where a builder constructs housing at the intended location using in substantial part raw materials such as wooden boards, plywood panels, and steel Lally columns. The materials are assembled piece by piece over a previously prepared portion of ground, for example, a poured concrete slab or a poured concrete or cinder block foundation.

There have been a variety of efforts to depart from the conventional construction techniques used to create dwellings, as well as commercial spaces and like. One of the alternatives to stick-built construction is very generally referred to as modular housing. As opposed to stick-built construction, where the structure is built on-site, a modular house is constructed in a factory and then shipped to the site, often by means of a tractor-trailer. A drawback of modular housing is that the prospective buyer can customize the structure layout only to a relatively limited degree. That is, while certain features, for example a closet, may be added or subtracted from a room, the general shape and layout of the house cannot be changed or adapted to the customer's preference.

Additionally, modular housing often exceeds in size normally-permitted legal limits for road transport. For example, in the United States the maximum permitted dimensions for road transport are in general 102 inches in width, 13.5 feet in height and 65 to 75 feet in length. Thus, in many cases transporting a modular house from factory to site requires oversize load permits, which may impose restrictions on when transport can be undertaken and what routes can be utilized. Oversize road regulations may also require the use of an escort car and a trailing car as well. All of these requirements and restrictions inevitably increase the cost of the modular housing.

Another alternative to stick-built construction is what is commonly referred to as a mobile home or trailer home. Mobile and trailer homes, like modular housing, are constructed in a factory and then transported to the intended location. They can be configured as two or three separate pieces which are joined at the receiving location, in which case they are referred to in the United States as a double-wide or a triple wide. Mobile and trailer homes often require less on-site finishing prior to occupancy than modular housing. On the other hand, such homes generally are almost always single story, tend to have a limited floor plan essentially dictated by transport requirements, and often cannot be customized by the buyer to any substantial degree. Like modular houses, mobile and trailer homes often exceed oversize road regulations with the attendant drawbacks described above.

A still further alternative approach to stick-built construction is to utilize wall panels (not entire houses or rooms) which are fabricated in a factory and transported to a building site for assembly into a structure and finishing. In particular, such wall boards are referred to as structural insulated panels, or SIPs for short. A SIPs panel typically is a foam core panel faced on each side with a structural board. Using SIPs in construction is often regarded as of limited benefit relative to stick-built construction, because the finishing of the house, as opposed to the framing, is generally the most expensive part of construction. In addition, SIPs are used in lieu of load-bearing vertical posts and studs, and thus bear the weight of the structure throughout their length. As a result, when apertures are cut in or positioned with SIPs where windows and doors are to be placed, the builder must insert a lintel or header across the top of each aperture to distribute vertical loads imposed from above each window and door to the load-bearing sides. This too increases the costs of using SIPs.

There are also temporary offices, or site trailers, which are similar in dimension to a trailer house. Temporary offices are typically rendered in steel, and are simply sheltered locations containing storage, office and meeting areas. They are not suitable for permanent residency or occupancy.

SUMMARY OF THE INVENTION

The present invention is a set of wall, floor and ceiling components that can be fabricated in a factory and delivered to a construction site, where they can be assembled into structures suitable for human or material occupancy, such as housing, offices, retail space, and warehouse use. The components described herein can be easily shipped from a factory to construction site. Moreover, the wall components are structured to support all designed-for vertical loads in their as-delivered state, yet can be customized on-site with doors and windows in an open-ended variety of styles, notwithstanding their factory-built nature. Additionally, the finished structures made in accordance with the inventions disclosed herein can be assembled in a multitude of configurations. Thus these inventions advantageously accord the user both the advantages of individualized customized construction and the efficiency and economy of factory fabrication.

In one aspect, the present invention is directed to a transportable wall component for a building structure having a ceiling and a member selected from the group consisting of a door assembly and a window assembly, where the wall component comprises a floor plate, a spanning beam and first and second structural column assemblies, wherein the floor plate spans the horizontal length of the wall component, the spanning beam is positioned above the floor plate and spans the horizontal length of the wall component, and the spanning beam is structured to carry structural weights and loads received from the ceiling of the building and additional floors, if any.

The wall component additionally features a first structural column assembly and a second structural column assembly, each of which are positioned between the spanning beam and the floor plate and structured to carry structural weights and loads received from the spanning beam. Further, the first and second structural column assemblies are inset from the vertical edges and separated by a longitudinal distance to define an intercolumnar region whose width is greater than the width of the member selected from the group consisting of a door assembly and a window assembly. An exterior panel fastened between the first and second structural column assemblies defines an uninterrupted planar and continuous surface over the intercolumnar region.

In another aspect, the present invention is directed to a method of constructing a building structure, wherein a shipping module is received which is comprised of a floor component, a wall component, and a ceiling component. The wall component received in this shipping module comprises a floor plate that defines the lower longitudinal edge of the wall component and which spans the horizontal length of the wall component, and a spanning beam that defines the upper longitudinal edge of the wall component. The spanning beam is positioned above the floor plate and spans the horizontal length of the wall component, and is structured to carry structural weights and loads received from the ceiling of the building and additional floors, if any.

The wall component received in this shipping module further comprises a first structural column assembly and a second structural column assembly, which are positioned between the spanning beam and the floor plate and structured to carry structural weights and loads received from the spanning beam. The first and second structural column assemblies are inset from the vertical edges and separated by a longitudinal distance to define an intercolumnar region whose width is greater than a member selected from the group consisting of a door assembly and a window assembly, and there is an exterior panel fastened between the first and second structural column assemblies to define an uninterrupted planar and continuous surface over the intercolumnar region. Means are additionally provided for rigidifying the wall component for transport.

In another aspect of the invention, the floor component is positioned over a prepared surface, the wall component is positioned over the floor component and secured to the floor component, and the ceiling component is positioned over the wall component and secured to it. Further, an aperture, defined by an edge region of the exterior panel, is opened in the intercolumnar region of the wall component, where the aperture is dimensioned to accept the member selected from the group consisting of a door assembly and a window assembly, and the member is positioned in the aperture and secured proximate to the edge region of the exterior panel.

These and other aspects of the present invention are described in the drawings annexed hereto, and in the description of the preferred embodiments and claims set forth below.

DETAILED DESCRIPTION OF THE PREFERRED EMBODIMENTS

The inventions described herein are further developments of the systems described in U.S. Pat. Nos. 8,474,194 and 8,733,029, the contents of each of which are incorporated herein by reference, as if fully set forth herein.

As shown in the figures and described herein, the basic components comprising the present invention are a wall component 200, a floor component 300, and a ceiling component 400. A number of these components can be fabricated and dimensioned as described herein and positioned together to form a shipping module 100. The components are dimensioned so that the shipping module 100 is within U.S. federal highway dimensional restrictions. As a result, shipping module 100 can be transported over a limited access highway more easily, and with appropriate trailering equipment, transported without the need for oversize permits. Thus, the basic components can be manufactured in a factory, positioned together to form the shipping module, and the modules can be transported to the desired site for the structure, where they can be readily assembled and customized, as described herein.

The materials for fabricating the components herein are as disclosed, and otherwise advantageously utilize the materials customarily used in the construction industry without the need for new materials for their fabrication.

Wall Component

Figure 2A:
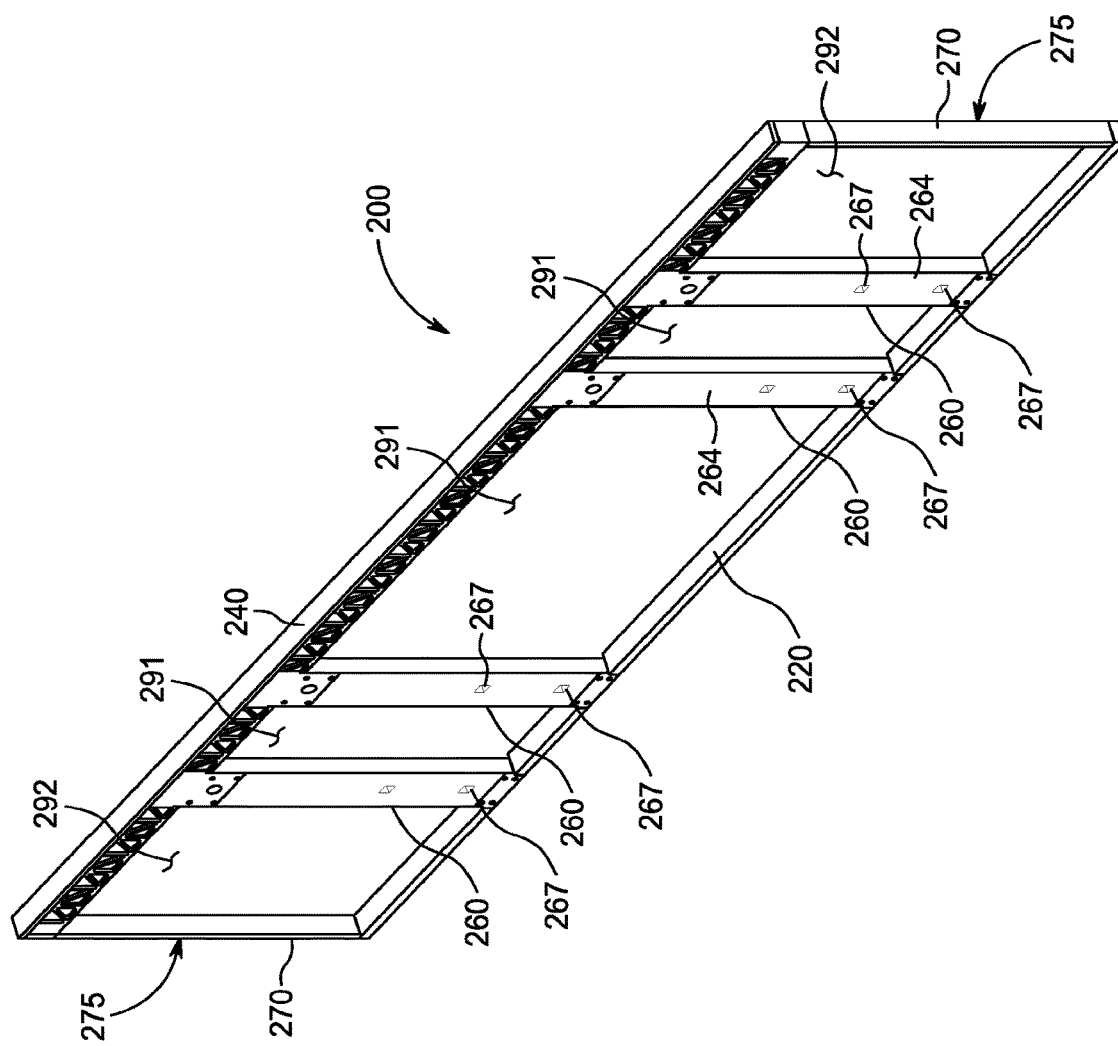
FIG. 2A is an overall perspective view of a wall component in accordance with the present invention, with interior and exterior paneling omitted.
Figure 2B:
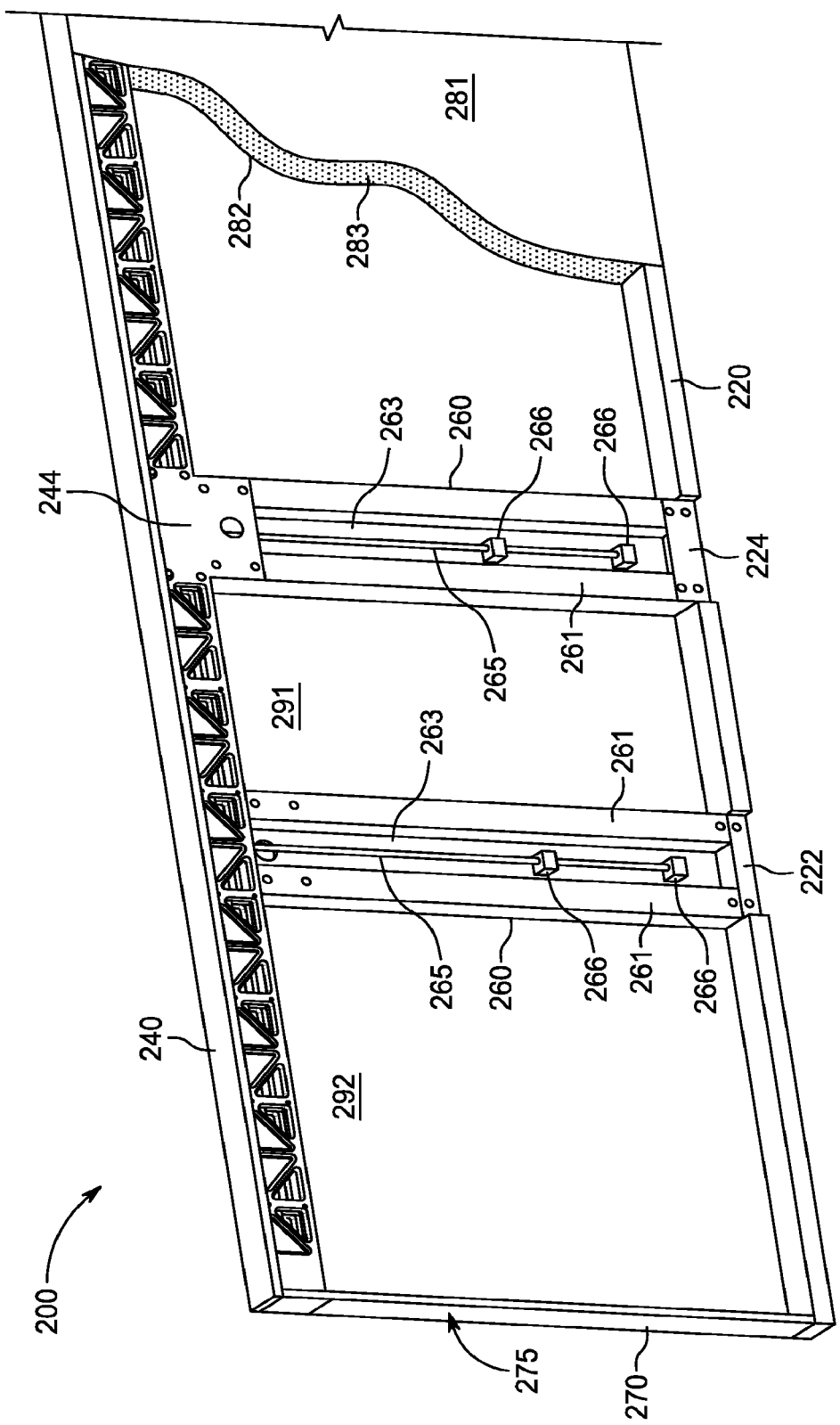
FIG. 2B is a cutaway perspective view of a wall component in accordance with the present invention.

FIGS. 2A and 2B depict transportable wall component 200 of the present invention. Multiple numbers of wall component 200 can be employed in the present inventions to achieve a finished structure, some of which may have the same dimensions as the other(s), and some of which may not. Typically a finished structure will utilize four wall components 200.

FIG. 2A depicts the interior face of wall component 200 and FIG. 2B depicts the exterior face. Wall component 200 is defined by floor plate 220, a spanning beam 240 and one or more structural column assemblies 260. Structural column assemblies 260 position spanning beam 240 a fixed distance above floor plate 220, and support the weight of spanning beam 240 plus all structural weights and loads (such as shock loads during transport and interior loads during use) imposed on spanning beam 240. The fixed distance defines the ceiling height of the interior.

There is also an end piece 270 fastened at each vertical edge 275 of wall component 200. These end pieces 270 are not structural elements and can be removed when finishing the structure in accordance with the design preferences of the purchaser, such as to create cantilevered upper stories in a multi-story structure that utilizes the present invention, or to accommodate corner window treatments.

The regions between adjacent structural column assemblies 260 are referred to herein as intercolumnar regions 291, and are characterized as homogeneous space not containing any columns, studs or other structural members or material, although such regions can contain insulating or other non-structural filler material. Comparably, the regions between each vertical edge 275 of wall component 200 and the adjacent structural column assembly 260 are referred to herein as extracolumnar regions 292, and are characterized as homogeneous space not containing any columns, studs or other structural members or material, although such regions can contain insulating or other barrier material.

The horizontal length of wall component 200 can vary in accordance with design considerations. Floor plate 220 spans the full horizontal length of wall component 200, and in this preferred embodiment is a continuous member, although there are plural notches 222 in floor plate 200 to receive lower column gussets 224, shown in FIG. 2B, the purpose of which will be described below.

Figure 2C:
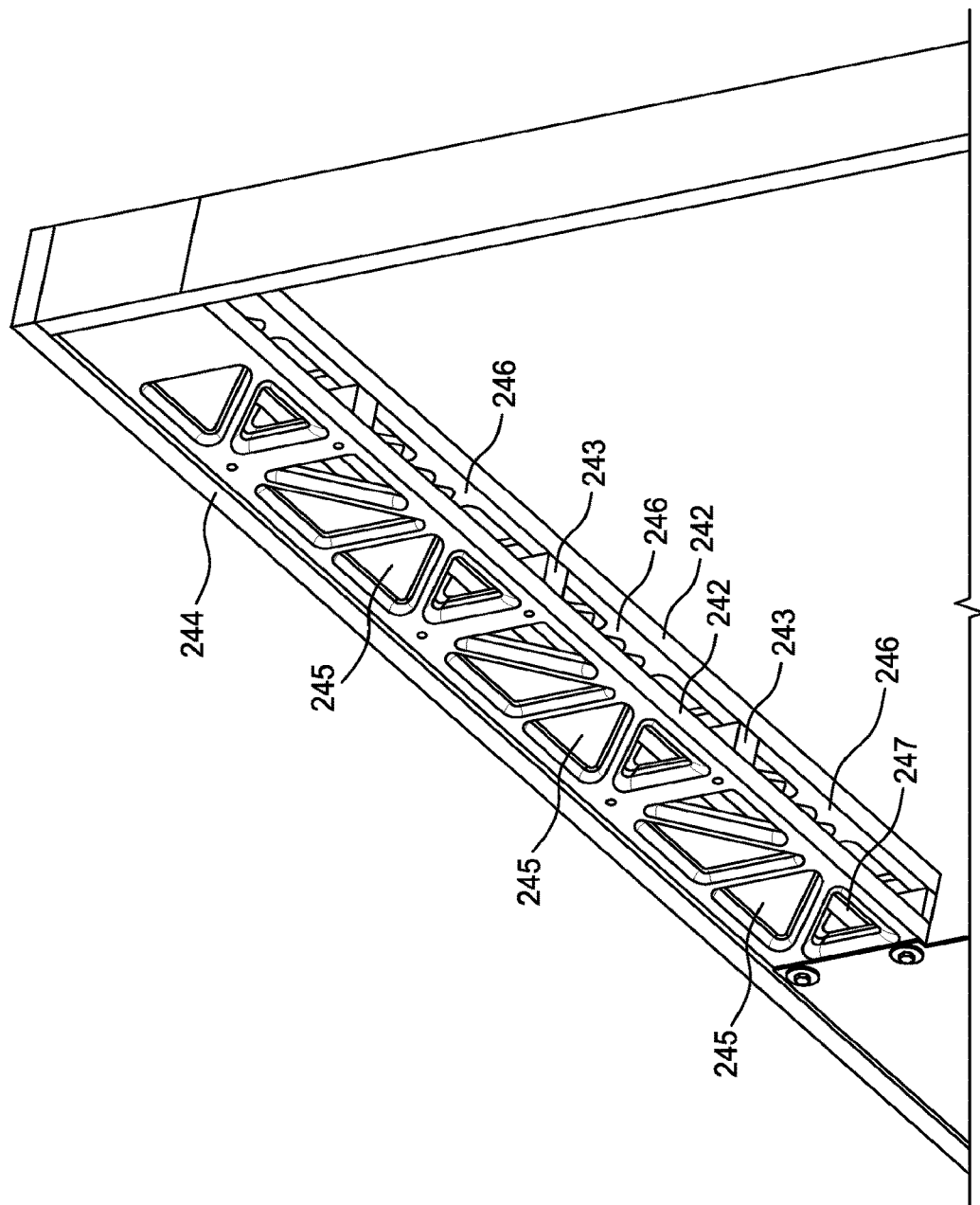
FIG. 2C is a perspective view depicting in greater detail the spanning beam of the present invention.

Spanning beam 240, like floor plate 220, spans the full horizontal length of wall component 200. Referring to FIG. 2C, spanning beam 240 comprises two truss structures 242, spaced apart by a plurality of lateral spacers 243 and a beam cap 244, to form a number of connected box structures 245. Each box structure 245 has an interior void 246 through which passes a utility line 247. Utility line 247 is schematically illustrated as a single line, but can comprise multiple lines. Thus utility line 247 can be one or more of an electrical power line, a line for HVAC control, a line for security system control, a line for local area network computer and peripheral device communication, etc.

The spacers 243 each have an aperture through which utility line 247 passes between box structures 245. The two truss structures 242 of spanning beam 240 are sufficiently strong in design to bear without yielding or unduly flexing all structural weights and loads above it (e.g., upper floor(s), ceiling, etc.), and to transfer those weights and loads to structural column assemblies 260.

The exterior view of FIG. 2B shows two structural column assemblies 260. Each assembly 260 comprises a pair of columns, each of which is denoted structural column 261. The two structural columns 261 of a structural column assembly 260 are spaced apart a fixed distance to define an air space 263 in each assembly 260. As shown in the interior view of FIG. 2A, the interior face of structural column assemblies 260 are covered with a column panel 264. The structural columns 261 are sufficiently strong in design to bear all structural weights and loads transferred to the structural column assemblies 260 by the associated spanning beam 240. Wood is the preferred material for structural columns 261.

The embodiment shown in FIGS. 2A and 2B is a long wall component 200, and thus as shown has been fabricated with four structural column assemblies 260. Correspondingly shorter wall components 200 can be fabricated with fewer structural column assemblies 260; for example two structural column assemblies 260, or even one, if stability considerations permit. It is preferred however that each wall component contain one or more paired sets of structural column assemblies 260; i.e., two structural column assemblies 260, four structural column assemblies 260, etc.

The lateral placement and number of structural column assemblies 260 is dictated by structural considerations that vary in accordance with the particular design. However, in the case where two or more structural column assemblies 260 are contained in wall component 200, it is preferred that the intercolumnar distance (the horizontal distance between two adjacent structural column assemblies 260) be more than the aggregate width of a door frame assembly and/or one or more window frame assemblies, to permit placing between assemblies 260 such of those features at such locations as the purchaser may freely select. Generally, the larger the intercolumnar distance, the greater will be the freedom to custom place doors, windows and other apertures in wall component 200 in accordance with the user's needs and wants.

Further, it is preferred in the present invention that the structural column assemblies 260 contained in any wall component 200 be inset from the vertical edges 275 to which end pieces 270 are fastened, in order to liberate the corner spaces for increased interior and exterior architectural design flexibility. In particular, it is preferred that the extracolumnar distance (the horizontal distance between each vertical edge 275 of wall component 200 and the first adjacent structural column assembly 260) be more than the aggregate width of a door frame assembly and/or one or more window frame assemblies, and preferably substantially more than that width. It is also preferred that the lateral placement and number of structural column assemblies 260 be in accordance with the geometrical relationships set forth in further detail below.

Each air space 263 provides room for utility lines (for example one or more of an electrical power line, a line for HVAC control, a line for security system control, a line for local area network computer and peripheral device communication, etc.) and for service lines (for example one or more of a sewer vent line, sewer line, water line, etc.). FIG. 2B shows a vertically-disposed utility line 265 in each air space 263 that is connected to the utility line 247 running through the spanning beam 240, discussed above. Each utility line 265 is partnered with one or more junction boxes 266, which are accessible through cutouts 267 (FIG. 2A) in column panels 264. Junction boxes 266 can be used for a variety of purposes; for example, electric power outlets, electrical power switches, HVAC control panels, security system controls, data ports and the like.

To reduce the potential for racking, a lower column gusset 224 (shown in FIG. 2B) secures the bottom of each structural column assembly 260 to the floor plate 220 using four through-bolts, with two spaced-apart through-bolts passing through the structural columns 261 and two spaced-apart through-bolts passing through the floor plate 260, although the specific arrangement and means of securing the gusset 224 is a matter or design choice. The bottom portion of each lower column gusset 224 is received in the corresponding notch 222 in floor plate 220, as described previously.

Likewise, and also to reduce the potential for racking, an upper column gusset 244 (also shown in FIG. 2B) secures the top of each structural column assembly 260 to the spanning beam 240, with four spaced-apart through-bolts passing through the structural columns 261 and four spaced-apart through-bolts securing upper column gusset 244 to the spanning beam 240, although here too the specific arrangement and means of securing the gusset 244 is a matter or design choice.

Figure 1A:
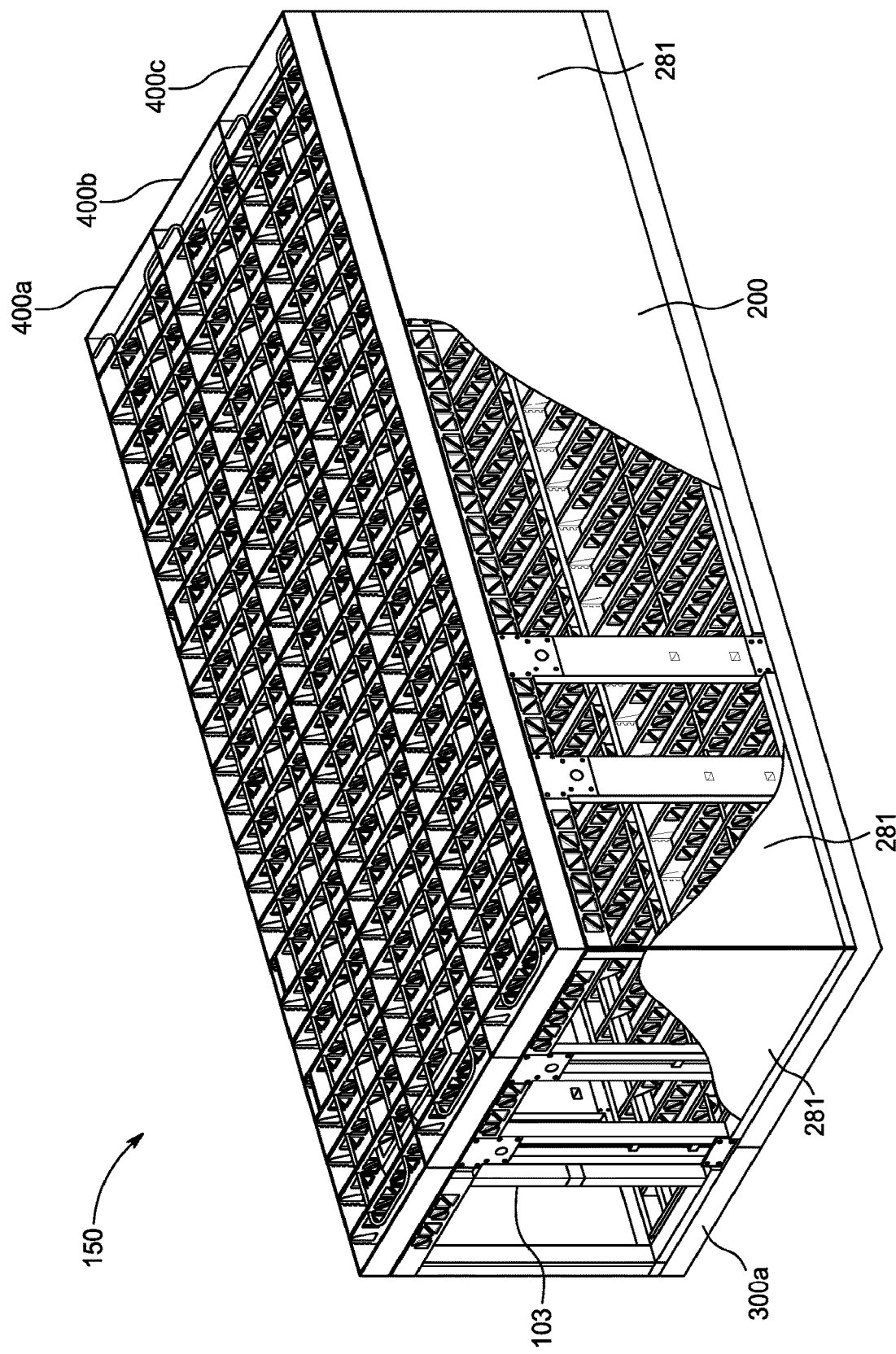
FIG. 1A is a perspective view of a finished structure prepared in accordance with the present invention.

The exterior surface of wall component 200 is faced with exterior skin or sheathing 281, as depicted for illustrative purposes partially cut away in FIGS. 1A and 2B. Exterior sheathing 281 optionally covers the full width and height of wall component 280 so as to be generally continuous uninterrupted and planar in that region with no cut-outs or openings for doors, windows or the like. Alternatively, exterior sheathing 281 can be dimensioned only to be generally continuous uninterrupted and planar in the intercolumnar region 291, leaving exposed structural column assemblies 260, which can then be faced with a different material than is used for sheathing 281, to achieve a pleasing architectural image. As another alternative, exterior sheathing 281 can be extended across structural column assemblies 260 while leaving exposed one or both of lower column gusset 224 and upper column gusset 244, which optionally can then be given a pleasing architectural treatment.

The interior surface of wall component 280 is depicted in FIG. 2B faced with interior skin or sheathing 282, which in this embodiment covers the full width and height of wall component 280. In finished form, the interior and exterior of wall component 280 are generally continuous uninterrupted and planar throughout with no cut-outs or openings for doors, windows or the like (except for cutouts 267). In one embodiment of the present invention, wall component 280 can be delivered in this state to the construction site. Sheathing 281, 282 preferably are formed of a material that can be sawn or cut with relative ease, particularly at a construction site.

In the void between sheathing 281 and sheathing 282, there is shown in FIG. 2B filling material 283, which can be thermal insulation, such as spun fiberglass, rigid insulation such as expanded or extruded polystyrene board or ISO panels (polyisocyanurate), blown insulation, sound absorbent insulation, or the like. Such filling material 283 can be omitted if the use for the resulting structure including wall component 200 will not require it, such as may be the case for a dry goods warehouse, which may be able to dispense with thermal insulation.

Notably, sheathing 281, 282, either alone or in combination with filling material 283, do not need to have significant strength in the vertical direction, such as to resist compressive loads. This is because all substantial structural weights and loads are transferred to the structural column assemblies 260. Therefore, in appropriate applications there need not be a bond of significant strength between sheathing 281, 282 and filling material 283, filling material 283 need not be rigid (i.e., can be pliable, such as spun fiberglass, or discrete, such as blown material, or omitted), and sheathing 281, 282 can be relatively thin in cross-section.

Accordingly, sheathing 281, 282 in one embodiment can be made of particle board. There is no need to use drywall (sold under the trademark Sheetrock®) either for structural purposes or for finishing. In another embodiment, interior sheathing 282 is fabricated of relatively thick paper, of a weight comparable to that used as the exterior surfaces of drywall. With this embodiment, interior sheathing 282 can be unrolled from a continuous roll of paper (the paper roll optionally having a width approximating the length of structural column assemblies 260), and then affixed to one or more of floor plate 220, spanning beam 240, structural column assemblies 260 and filling material 283 of wall component 280, to yield a seamless interior finish for wall component 280. This advantageously compares to conventional construction techniques, whether stick-built, SIPs or steel construction, wherein sheets of drywall first must be secured to wall elements, and then the seams between adjacent sheets must be given a smooth transition by applying mortar such as spackling compound followed by sanding. These expensive and laborious steps of interior wall finishing can be avoided by employing, in accordance with the teachings of this disclosure, a continuous roll of paper to fabricate interior sheathing 282.

In a further alternative embodiment, filling material 283 can be a dense spray foam that is strongly bound to sheathing 281, 282 (made preferably of ¼" plywood), and also to floor plate 220, spanning beam 240 and to one or more structural column assemblies 260, to form a high strength laminate. The filling material 283 can be inserted into the wall component prior to or after applying one of sheathing 281 and 282 (but before applying the other of sheathing 281 and 282). Alternatively, after applying both of sheathing 281 and 282, the filling material can be sprayed into the wall component 280 through hatches, which will then be plugged and sealed.

Sheathing 281, 282 optionally can also be used to reduce the potential for racking by bonding either or both to two or more of spanning beam 240, floor plate 220 and structural column assemblies 260, either in addition to or in lieu of one or more of gussets 224 and 244.

In another embodiment of the present invention, tension members (not shown), such as steel rods, can be diagonally positioned in an "X" configuration and secured to adjacent structural column assemblies 260, subject to intended door and/or window placement. Use of such tension members can reduce the need for one or more of gussets 224, 244, and sheathing 281, 282, and thus provides for further freedom of design. All of these components—the diagonally positioned tension members, gussets 224, 244 and sheathing 281, 282—are means for rigidifying wall component 200 to improve its robustness during transport and erection of the structure at the construction site.

Wall component 200 lends itself to a high degree of customization in terms of type, size and location of doors, windows and the like. For example, once erected at the intended location for the structure, the builder can cut apertures in wall component 200 in accordance with the purchaser's design choices. Window and door assemblies of any number, size and shape can thus be placed anywhere in intercolumnar regions 291 and extracolumnar regions 292, limited only by practical dimensional considerations. Corner window treatments, including floor to ceiling windows, both fixed and openable, can be included with relative ease, since end pieces 270 are non-structural and can be removed, as discussed above. Neither the sheathing 281, 282 nor any filling material 283 in regions 291, 292 carry any vertical loads, and thus apertures can be cut in these regions without fear of compromising the structure's load-bearing ability, and without the need for adding on-site any load-distributing lintels or headers.

After apertures are cut to the appropriate size and shape, window assemblies and door assemblies can then be inserted and secured to wall component 200 with adhesive or by other suitable means. A wide variety of window and door assemblies are commercially available and suitable for use with the present invention. As a non-limiting example, a door assembly can include all components for mounting the door and rendering it operative, such as two side jambs, a head jamb and a sill, together with a door hinged to one of the side jambs. Likewise as a non-limiting example, a window assembly can include all components for mounting the window and rendering it operative, such as a sill, side jambs, head jambs, window frames and glass, sash pulleys and the like.

Floor Component

Figure 3A:
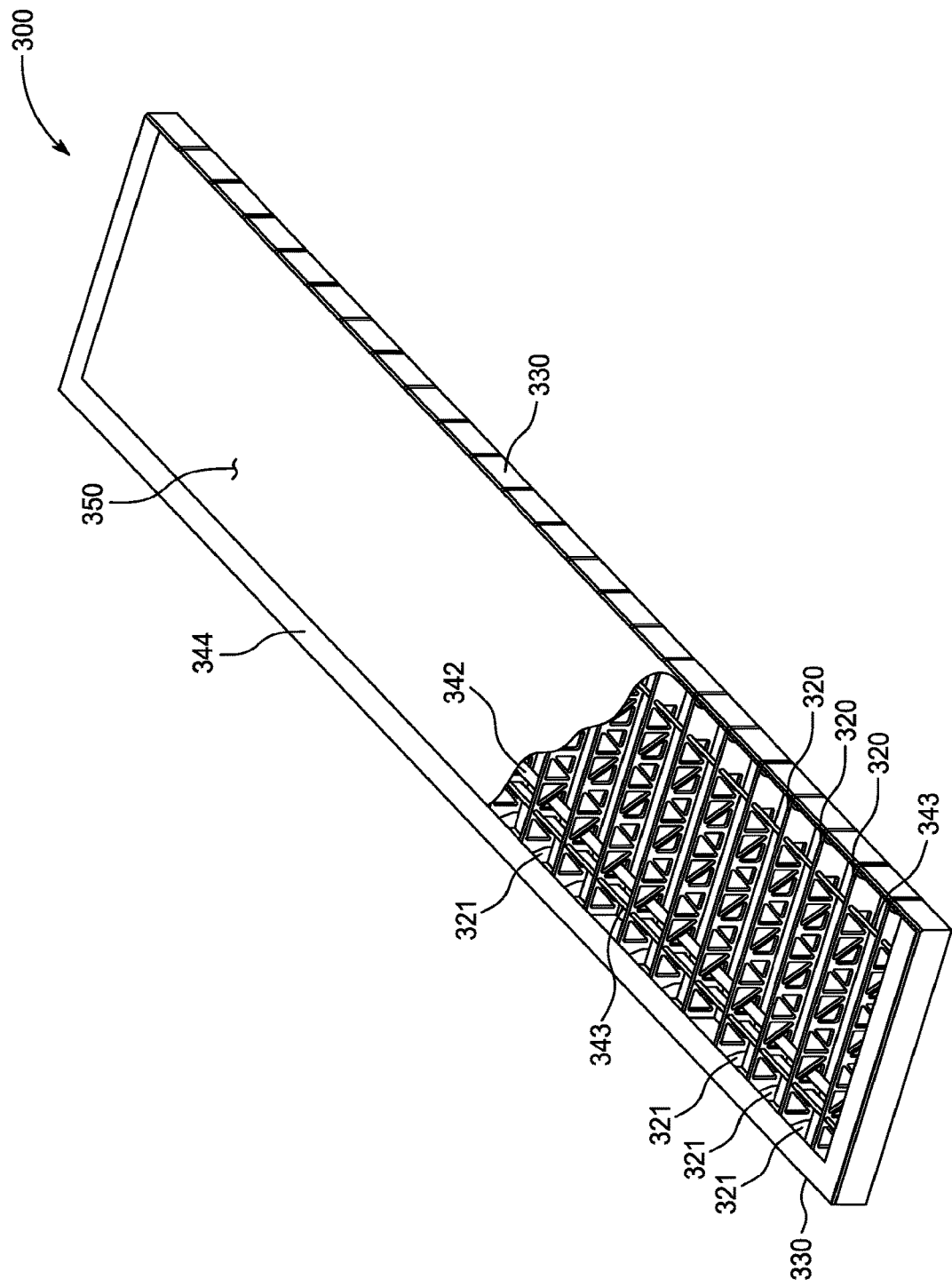
FIG. 3A is an overall cutaway perspective view of a floor component in accordance with the present invention.
Figure 3B:
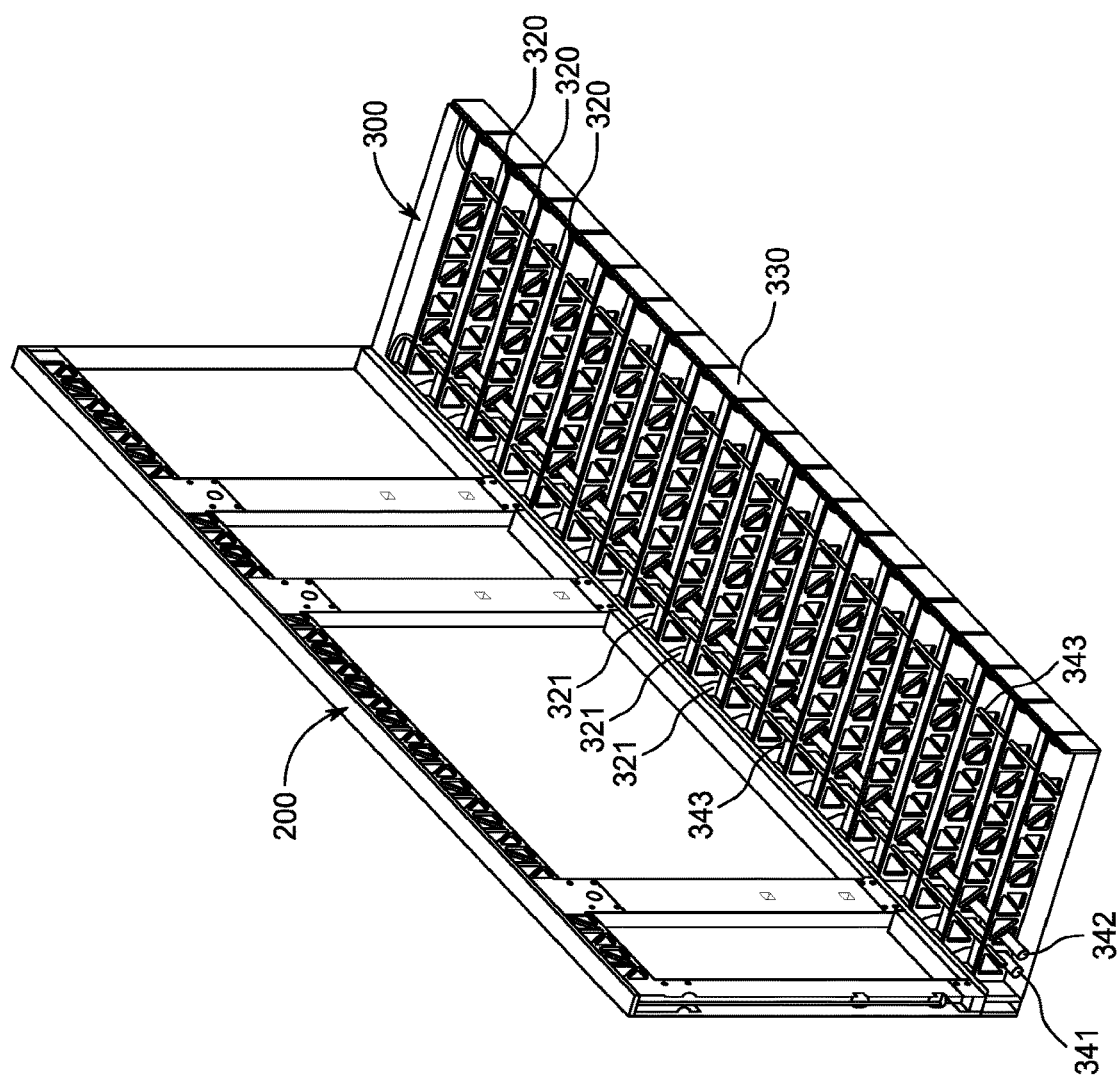
FIG. 3B is a sectional perspective view depicting the interior of a floor component and an adjacent wall component in accordance with the present invention, with sheathing and flooring omitted.

FIGS. 3A and 3B depict transportable floor component 300 of the present invention. Multiple numbers of floor component 300 can be employed in the present inventions to achieve a finished structure, each of which can have the same or different dimension than the other(s).

In floor component 300, a plurality of spaced-apart floor joists 320, each in this embodiment of truss design, are secured using hangers 321 to a floor girder structure 330 positioned on each of the opposite longitudinal edges of floor component 300. Floor joists transfer floor loads to the floor girder structures 330. Floor girder structures 330 receive the floor loads and transfer them to either a foundation structure or a spanning beam 240 underlying the edge, depending upon whether floor component 300 is the first floor of the structure, or a higher floor.

Floor paneling 350, such as plywood paneling, covers the floor joists 320. Such floor paneling is shown in FIG. 3A partly cut away to reveal the underlying structure. In addition, there is a stand-off plate 344 bordering floor component 300. Stand-off plate 344 defines a shallow recess in the interior region of floor component 300 for the installation of carpeting during manufacture, to assist in reducing binding when the floor component is positioned as needed to form a shipping module 100. Floor paneling 350 beneficially provides means for rigidifying floor component 300 to improve its robustness during transport and erection of the structure at the construction site.

A plurality of service lines run in a longitudinal direction through floor joists 320. In particular, there is shown in FIG. 3B a fresh water line 341 for fresh water supply. For simplicity, only one line 341 is depicted, although two lines can be provided (one for heated water, one for unheated water) in accordance with requirements. There is also shown in FIG. 3B a wastewater line 342 for receipt and transfer of grey water and/or sewage to municipal systems or other receiving systems. Optionally, there is shown in FIG. 3B utility lines 343 (for example one or more of an electrical power line, a line for HVAC control, a line for security system control, a line for local area network computer and peripheral device communication, etc.) one positioned above fresh water line 341 and waste water line 342. There can also be included in floor component 300 piping for radiant heating (not shown), in accordance with preferences.

Ceiling Component

Figure 4A:
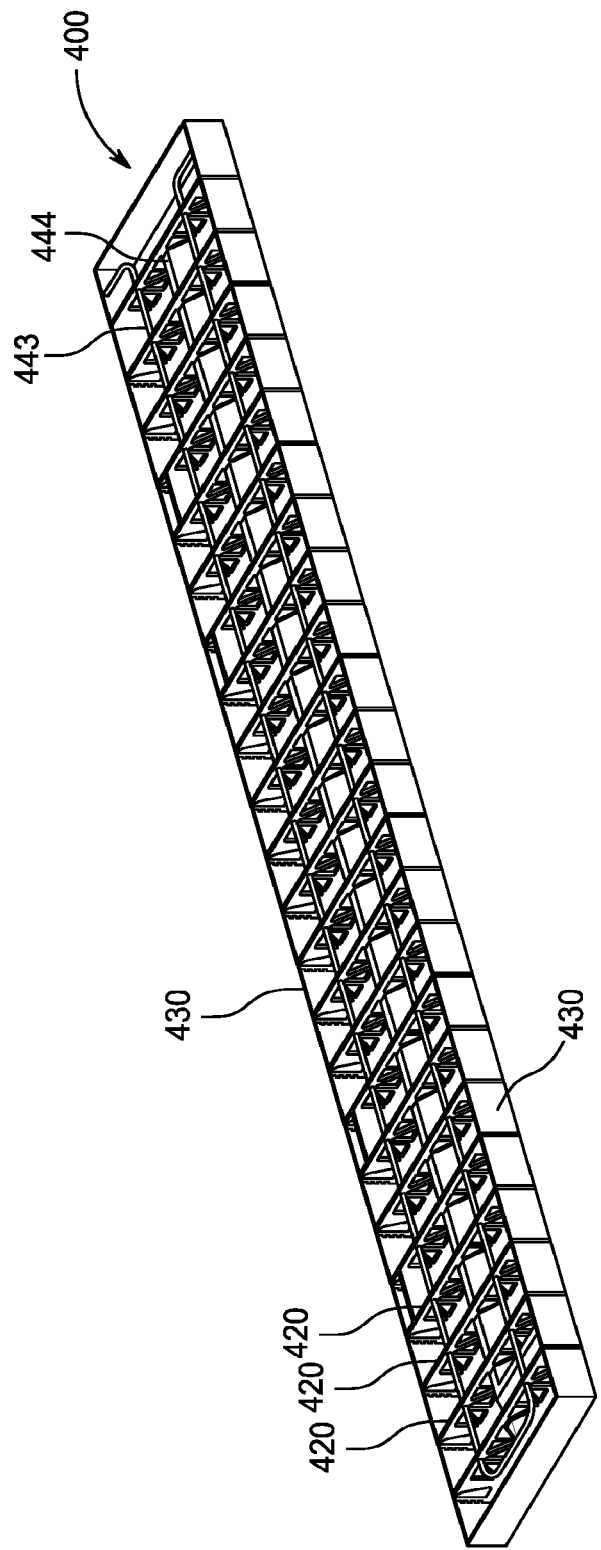
FIG. 4A is an overall perspective view of a ceiling component in accordance with the present invention.
Figure 4B:
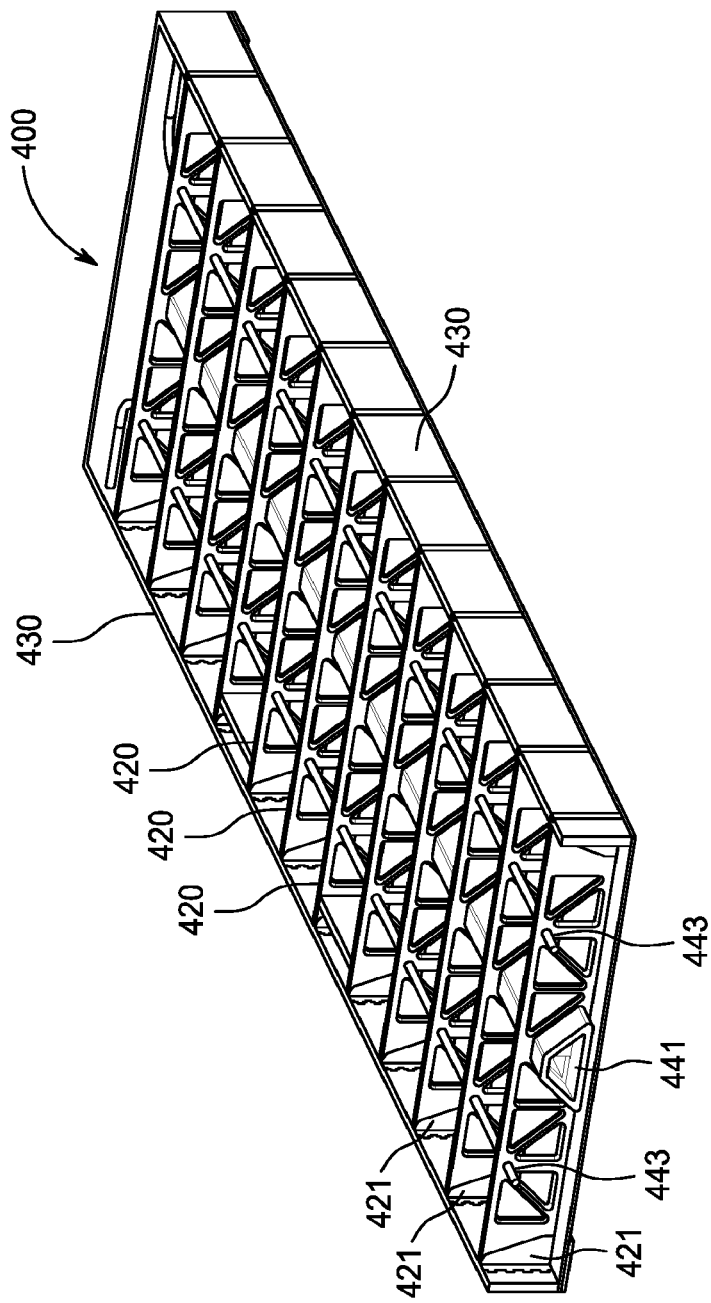
FIG. 4B is a sectional perspective view depicting the interior of a ceiling component in accordance with the present invention.

FIGS. 4A and 4B depict transportable ceiling component 400 of the present invention. Multiple numbers of ceiling component 400 can be employed in the present inventions to achieve a finished structure, each of which can have the same or different dimension than the other(s).

Ceiling component 400 includes a plurality of spaced-apart ceiling joists 420, each in this embodiment of truss design, which are secured using hangers 421 to a ceiling girder structure 430 positioned on each of the opposite longitudinal edges of ceiling component 400. Ceiling joists 420 transfer the weight of the ceiling (plus other weights and loads as imposed from above) to the ceiling girder structures 430, where the loads are received and borne by the spanning beam 240 positioned below them, and transferred in turn to structural column assemblies 260. The underside of ceiling component 400 is surfaced with ceiling paneling 450 (not visible in the figures), which optionally can be used to surface the topside surface of ceiling component 400 as well. Ceiling paneling 450 beneficially provides means for rigidifying ceiling component 400 to improve its robustness during transport and erection of the structure at the construction site.

In this embodiment, and as shown in FIG. 4A, a utility line 443 (for example one or more of an electrical power line, a line for HVAC control, a line for security system control, a line for local area network computer and peripheral device communication, etc.) is run through ceiling joists 420 generally in a longitudinal direction. Line 443 enters ceiling component 400 through a first of the ceiling girders 430 at a first longitudinal distance from a distal edge of ceiling component 400 to form a U-shaped loop that exits a second of the ceiling girders 430 of ceiling component 400 at approximately the first longitudinal distance from the distal edge. In the case where multiple ceiling components 400 are use, this utility line configuration permits connecting the utility lines 443 in series to create one continuous utility line traversing the ceiling in a sinuous fashion.

In addition to utility line 443, ceiling component 400 further includes an HVAC duct 444 positioned in a transverse orientation through ceiling joists 420. Louvres and apertures are connected to duct 444 through ceiling paneling 450 at appropriate locations to supply ventilation, cooled air, and/or heated air to the spaces below ceiling component 400. In addition, a water line can be positioned through ceiling joists 420 to provide fire retardant/extinguishing fluid (such as water) to overhead sprinklers or like delivery mechanisms positioned at appropriate locations.

Component Design Relationships

For ease of transport and maximum design flexibility, it is preferred that there be a specific dimensional relationship among elements 200, 300 and 400, as explained below.

Figure 1B:
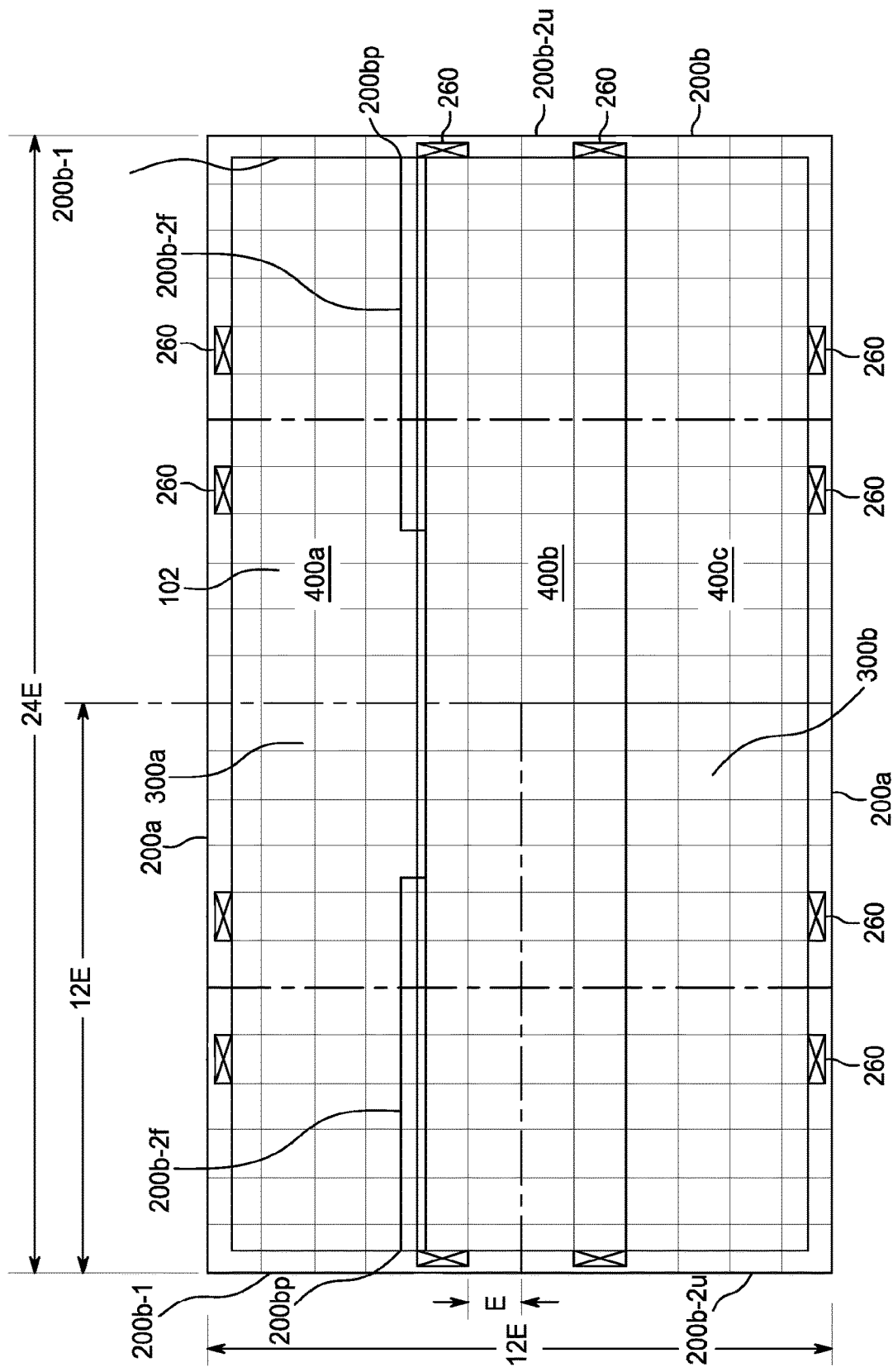
FIG. 1B is a top view of a finished structure that includes an orthogonal grid.

FIG. 1A shows a finished structure 150 formed using elements 200, 300 and 400, and FIG. 1B shows a top schematic view of the finished structure 150, which includes a geometrical orthogonal grid for clarity of explaining the dimensional relationships among components 200, 300 and 400. The basic length used for dimensioning is indicated as "E" in FIG. 1B; the orthogonal grid overlaid in FIG. 1B is 24 E long and 12 E wide, and illustrates the relative dimensions of the components.

More particularly, FIG. 1B depicts two long wall components 200a that are approximately 24 E long, and two short wall components 200b that are approximately 12 E long. The two long wall components 200a each contains four structural column assemblies 260 (two pairs), and the two short wall components 200b each contains two structural column assemblies 260 (one pair). The structural column assemblies 260 preferably are approximately E in width, as shown in the figure.

The two structural column assemblies 260 in short wall component 200b are symmetrically disposed about the midpoint of wall component 200b and separated each from the other by a distance of approximately 2 E. Each long wall component 200a in terms of geometrical relationship is a replication of two short wall components 200b placed edge 275 to edge 275.

Figure 1C:
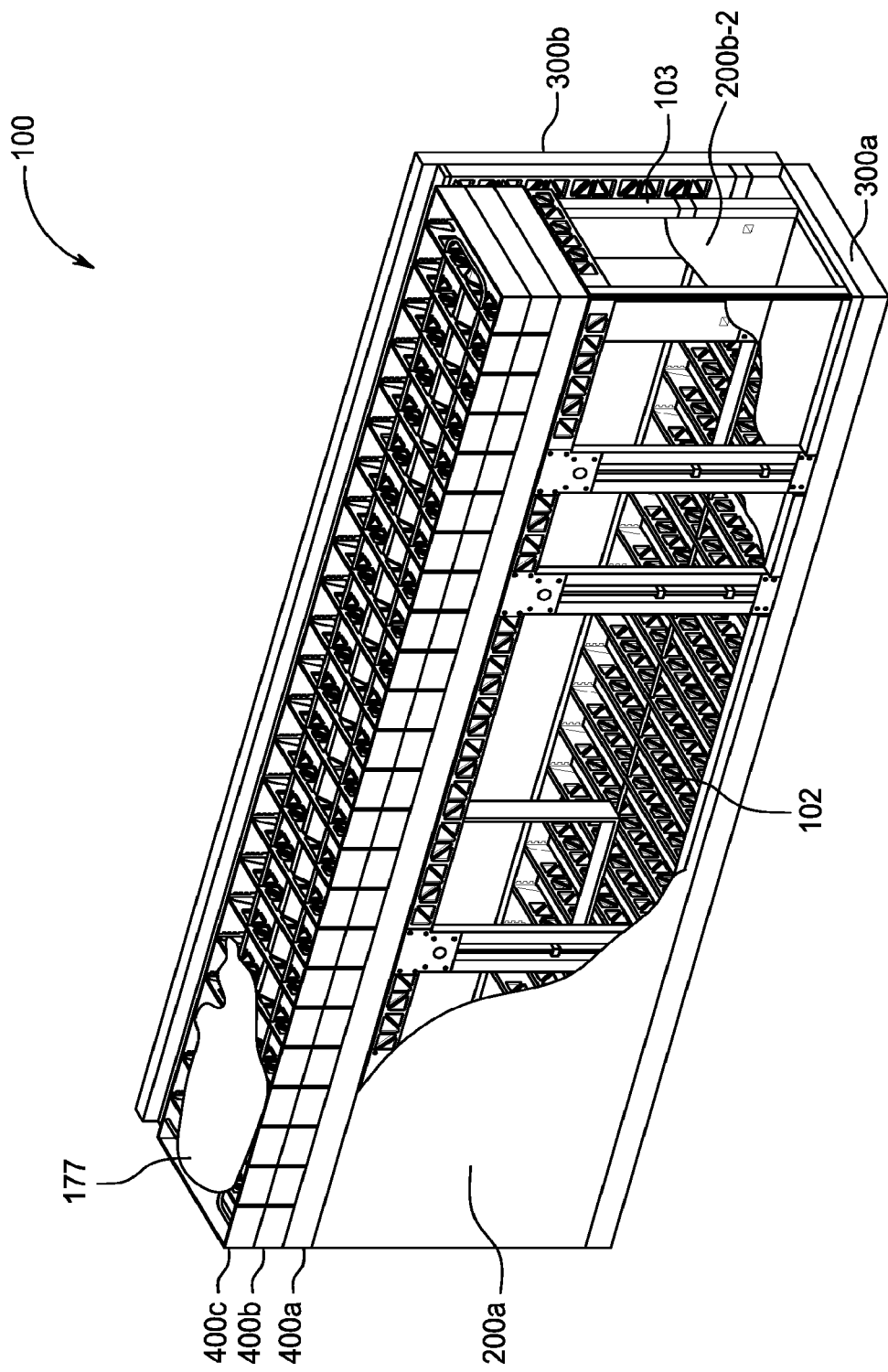
FIG. 1C is a shipping module from which is formed the finished structure shown in FIG. 1A.
Figure 1D:
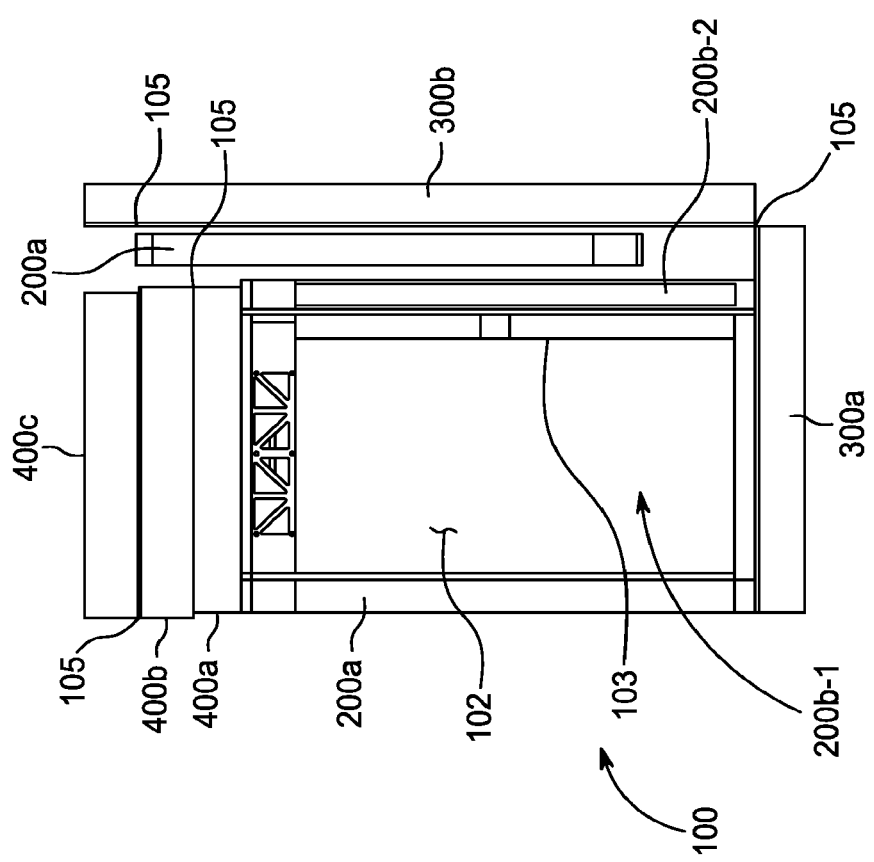
FIG. 1D is a side view of a shipping module prepared in accordance with the present invention.

Finished structure 150 includes three ceiling components 400, denominated 400a, 400b and 400c in FIGS. 1B, 1C and 1D. Each ceiling component of 400a, 400b and 400c is 24 E long and 4 E wide.

Finished structure 150 further includes two floor components 300 denominated, 300a and 300b and shown in FIGS. 1C and 1D. Each of floor components 300a and 300b is 24 E long; whereas floor component 300a is approximately 4 E wide and floor component 300b is approximately 8 E wide.

Components 200, 300 and 400 sized according to the dimensional relationships disclosed above can be positioned as shown in FIGS. 1C and 1D to form a shipping module 100. In the embodiment disclosed in those figures, short wall components 200b are each hinged to fold about a vertical axis, denominated 200 bp in FIG. 1B, so as to assist in producing a compact shipping module. Thus as shown in FIGS. 1C and 1D, fixed portion 200b-1 of each short wall component is fixed in position, while the pivoting portion 200b-2 is folded inward. Referring again to FIG. 1B, pivoting portion 200b-2 is shown both in its unfolded orientation as 200b-2u, and in its folded inward orientation as 200b-2f.

Shipping module 100 includes a fixed space portion 102 defined by ceiling component 400a, floor component 300a, a long wall component 200a and fixed portions 200b-1 of short wall components 200b. The remaining portion of short wall components 200b, pivoting portions 200b-2, are folded vertically inward and positioned against fixed space portion 102. As explained above, the finished structure 150 is formed from three ceiling components 400a, 400b and 400c; thus FIGS. 1C and 1D depict two additional ceiling components 400b and 400c stacked on top of the ceiling component 400a that in part defines fixed space portion 102. In turn, a second long wall component 200a is vertically positioned against outside pivoting portions 200b-2, and floor component 300b is vertically positioned against the second long wall component 200a.

Sizing components 200, 300 and 400 according to the dimensional relationships disclosed herein yields a compact shipping module 100, as can be seen from the figures. Further, when dimension "E" (see FIG. 1B) is 19.5 inches, the overall dimensions of shipping module 100 are approximately the same or less than a typical shipping container. Thus shipping module 100, when dimensioned according to the relationships disclosed herein using an "E" dimension of 19.5 inches, and when its components are stacked and positioned as shown in FIGS. 1C and 1D, has an overall length of approximately 39 feet, an overall width of approximately 8.5 feet and an overall height of 12.67 feet.

In addition, sizing components 200, 300 and 400 according to the dimensional relationships disclosed herein provides great flexibility in positioning together any number of finished structures 150 in the course of erection at the desired site, to yield a multitude of different structural configurations. For example, two finished structures 150 can be erected so that a wall component 200 of one structure is placed in contact with a wall component 200 of the other structure, with any of intercolumnar regions 291 and extracolumnar regions 292 of the two wall components 200 being juxtaposed. The builder can then cut apertures in those juxtaposed regions to connect the two structures in accordance with the purchaser's design choices. The location, size and shape of the connection is infinitely variable, in accordance with the purchaser's design choices, and is limited only by practical dimensional considerations such as the width of the juxtaposed intercolumnar/extracolumnar regions and the height of wall component 200.

Shipping Module Assembly

It is preferred that the fixed space portion 102 be in a relatively finished state prior to positioning together all other of the components 200, 300 and 400 as described above. That is, the fixed space portion 102 is preferably fitted during manufacture with all mechanical and other functionality that the structure 150 will require, such as kitchens, bathrooms, laundry rooms, HVAC closets, fireplaces, clothing closets, storage areas, corridors, etc. A temporary member 103 (shown in FIGS. 1C and 1D) provides support during shipping and is removed after delivery.

Preferably after fixed space portion 102 is finished to the desired state, the remaining components are stacked and positioned against fixed space portion 102 as described above. The components so stacked and positioned preferably are pivotally attached to the fixed space portion 102 at the locations 105 shown in FIG. 1D, to permit them to pivot about a horizontal axis during construction and to permit the user, in effect, to erect finished structure 150 simply by "unfolding" the positioned components. The stacked and positioned components can be pivotally attached at locations 105 by means of mechanical or flexible hinge mechanisms, surface mounted or recessed, and including, but not limited to, metal, plastic, leather, ferrous or non-ferrous material.

Each component 200, 300 and 400 can be sheathed in protective film 177 during fabrication and prior to forming the shipping module 100, an example of which is schematically illustrated in cutaway view in FIG. 1C as sheathing ceiling component 400c. Alternatively or in addition, the entire shipping module 100 can be sheathed in a protective film. These protective films accordingly constitute a means for protecting the shipping module 100 and components 200, 300 and 400 during shipping. In addition to the protection they give to the module and its components, such protective films have the added benefit of increasing the resistance of the components to such flexural and torsional stresses as may occur during transport of the components. These protective films constitute further means for rigidifying wall component 200 to improve its robustness during transport and erection of the structure at the construction site. It is preferred that such protective films remain in place until after the shipping module 100 is at the construction site. It is particularly preferred that the protective films sheathing each component 200, 300 and 400 remain in place until after the completion of erection, site work and all trade egress.

The shipping module is shipped to the building site by appropriate means. One such means is disclosed in U.S. Provisional Application No. 62/568,491, filed Oct. 5, 2017, the contents of which are incorporated by reference as if fully set forth herein. After the fixed space portion 102 is positioned over its desired location, such as on a poured concrete slab or a poured concrete or cinder block foundation, the components 200, 300 and 400 are "unfolded" in accordance with the sequence dictated by their interpositioned relationship in shipping module 100, the portions 200b-1 and 200b-2 of the short wall components 200b are bolted together (particularly at the spanning beam 240) to yield a rigid wall, and the other components are secured together to form finished structure 150, shown in FIG. 1A. The hinge mechanisms at locations 105 can then be removed.

Following assembly, in the case where lines 247 and 443 are electrical power lines, then the electrical power line 247 in each spanning beam 240 is connected to the electrical power line 443 in a ceiling component 400, the electrical power lines 443 in the three ceiling components 400 are connected in series, and those lines in turn are connected to the electric utility's service drop, thus energizing the structure's electrical service.

Prior to, during or following this assembly, as desired, apertures for one or more doors and windows are cut at desired locations in the intercolumnar and/or extracolumnar regions 291, 292 of wall components 200, and appropriate door and window assemblies are positioned and fastened in the apertures. Additional municipal hook-ups are made to the water line 341, the sewer line 342 to complete the structure, as relevant here.

As discussed above, any number of finished structures 150 can be positioned together at the desired site, to yield a multitude of different structural configurations. In addition, finished structures 150 can be stacked, one on top of the other, to yield multi-story structures. Interior staircases for such multi-story structures can be provided during manufacture in fixed space portion 102, together with insertion of an appropriate access aperture in ceiling 400a, or can be added after erection. Likewise, a pitched roof and other architectural additions can be delivered separately from shipping module 100 or fabricated on-site, and positioned onto ceiling components 400 of finished structure 150.

The foregoing detailed description is for illustration only and is not to be deemed as limiting the invention, which is defined in the appended claims.

What is claimed is:

1. A folded structure transportable to a site for erecting a building structure, the folded structure comprising:
    a fixed space portion defined by a first floor component, a first ceiling component and a first wall component having a horizontal length and two vertical edges, the first wall component comprising:
    a floor plate defining the lower longitudinal edge of the first wall component and spanning the horizontal length of the first wall component;
    a spanning beam defining the upper longitudinal edge of the first wall component, said spanning beam positioned above the floor plate and spanning the horizontal length of the first wall component, the spanning beam adapted to carry structural weights and loads received from the first ceiling component of the building structure and any additional floors;
    a first structural column assembly and a second structural column assembly, the first and second structural column assemblies positioned between the spanning beam and the floor plate and structured to carry structural weights and loads received from the spanning beam;
    the first and second structural column assemblies inset from the two vertical edges of the first wall component and separated by a longitudinal distance to define an intercolumnar region of a first width, the first width of the intercolumnar region being greater than a width of an aperture member, the first width and the width of the aperture member being configured to define a gap between the aperture member and at least one of the first structural column assembly and the second structural column assembly on at least one side of the aperture member, the aperture member selected from the group consisting of a door assembly of a second width and a window assembly of a third width; and
    an exterior panel fastened between the first and second structural column assemblies to define a generally continuous and uninterrupted planar surface over the intercolumnar region;
    the folded structure further comprising:
    a second ceiling component horizontally stacked on the first ceiling component;
    a second floor component vertically positioned against the fixed space portion opposite to the first wall component;
    a second wall component vertically positioned against the second floor component;
    means for pivotally connecting the second ceiling component to the first ceiling component, means for pivotally connecting the second floor component to the first floor component, and means for pivotally connecting the second wall component to the second floor component.

2. A method of constructing a building structure, comprising:
    receiving the folded structure described in claim 1;
    unfolding the second floor component so that the second floor component it lies parallel to the first floor component;
    unfolding the second wall component to a vertical position; and
    unfolding the second ceiling component so that the second ceiling component lies parallel to the first ceiling component and has a distal edge contacting the second wall component.

3. A folded building structure transportable to a site at which the folded building structure is to be erected, comprising:
    a fixed space portion defined by a first floor component, a first ceiling component and a first wall component having a length and a planar first fixed portion of a second wall component;
    a second ceiling component horizontally stacked in a second ceiling component folded position on the first ceiling component;
    a third ceiling component horizontally stacked in a third ceiling component folded position on the second ceiling component;
    a second floor component vertically positioned in a second floor component folded position opposite to the first wall component;
    a third wall component having a length and vertically positioned in a third wall component folded position against the second floor component;
    the second wall component having a planar first pivoting portion (a) disposed in a first pivoting portion folded position against the third wall component in the third wall component folded position and (b) adapted to be unfolded to a first pivoting portion unfolded position parallel to the planar first fixed portion of the second wall component;
    first means for pivotally connecting the second ceiling component to the first ceiling component, such first means adapted to permit the second ceiling component to pivot, about a first horizontal axis relative to the first ceiling component, from the second ceiling component folded position to a second ceiling component unfolded position;
    second means for pivotally connecting the third ceiling component to the second ceiling component, such second means adapted to permit the third ceiling component to pivot, about a second horizontal axis relative to the second ceiling component, from the third ceiling component folded position to a third ceiling component unfolded position;
    third means for pivotally connecting the second floor component to the first floor component, such third means adapted to permit the second floor component to pivot, about a third horizontal axis relative to the first floor component, from the second floor component folded position to a second floor component unfolded position;
    fourth means for pivotally connecting the third wall component to the second floor component, such fourth means adapted to permit the third wall component to pivot, about a fourth horizontal axis relative to the second floor component, from the third wall component folded position to a third wall component unfolded position; and
    fifth means for pivotally connecting the planar first fixed portion of the second wall component to the planar first pivoting portion of the second wall component, such fifth means adapted to permit the planar first pivoting portion of the second wall component to pivot, about a first vertical axis relative to the planar first fixed portion of the second wall component, from the first pivoting portion folded position to the first pivoting portion unfolded position parallel to the planar first fixed portion of the second wall component.

4. The folded building structure of claim 3,
wherein the fixed space portion is further defined by a planar second fixed portion of a fourth wall component;
the fourth wall component having a planar second pivoting portion (a) disposed in a second pivoting portion folded position against the third wall component in the third wall component folded position and (b) adapted to be unfolded to a second pivoting portion unfolded position parallel to the planar second fixed portion of the fourth wall component;
and
sixth means for pivotally connecting the planar second fixed portion of the fourth wall component to the planar second pivoting portion of the fourth wall component, such sixth means adapted to permit the planar second pivoting portion of the fourth wall component to pivot about a second vertical axis relative to the planar second fixed portion of the fourth wall component, from the second pivoting portion folded position to the second pivoting portion unfolded position parallel to the planar second fixed portion of the fourth wall component.

5. The folded building structure of claim 3, wherein the first, second and third ceiling components each has a length and a width, the first means pivotally connects the first and second ceiling components along the respective lengths of the first and second ceiling components, and the second means pivotally connects the second and third ceiling components along the respective lengths of the second and third ceiling components.

6. The folded building structure of claim 5, wherein the length of each of the first, second and third ceiling components is approximately equal.

7. The folded building structure of claim 5, wherein the width of each of the first, second and third ceiling components is approximately equal.

8. The folded building structure of claim 6, wherein the width of each of the first, second and third ceiling components is approximately equal.

9. The folded building structure of claim 4, wherein the first and third wall components are of approximately equal length, the second and fourth wall components are of approximately equal length, and the length of the first and third wall components is approximately twice the length of the second and fourth wall components.

10. The folded building structure of claim 9, wherein the length of each of the first, second and third ceiling components is approximately equal to the length of each of the first and third wall components.

11. The folded building structure of claim 10, wherein the length of each of the first, second and third ceiling components is approximately six times the width of each of the first, second and third ceiling components.

12. The folded building structure of claim 3, wherein the length of the first wall component and the length of the third wall component are each approximately 39 feet.

13. The folded building structure of claim 9, wherein the length of the first wall component and the length of the third wall component are each approximately 39 feet.

14. The folded building structure of claim 3, comprising an overall width of approximately 8.5 feet.

15. The folded building structure of claim 9, comprising an overall width of approximately 8.5 feet.

16. The folded building structure of claim 3, further comprising a removable protective film sheathing at least a portion of the folded building structure.

17. The folded building structure of claim 3, further comprising a removable protective film sheathing the entirety of the folded building structure.

18. The folded building structure of claim 5, further comprising a removable protective film sheathing at least a portion of the folded building structure.

19. The folded building structure of claim 5, further comprising a removable protective film sheathing the entirety of the folded building structure.

* * * * *

UNITED STATES PATENT AND TRADEMARK OFFICE
CERTIFICATE OF CORRECTION

PATENT NO. : 10,829,029 B2
APPLICATION NO. : 16/804473
DATED : November 10, 2020
INVENTOR(S) : Tiramani et al.

Page 1 of 1

It is certified that error appears in the above-identified patent and that said Letters Patent is hereby corrected as shown below:

In the Claims

In Column 14, Claim 2, Line 3, delete "it lies" and insert -- lies --, therefor.

In Column 14, Claim 3, Line 15, delete "component and" and insert -- component, --, therefor.

In Column 15, Claim 4, Line 23, delete "pivot" and insert -- pivot, --, therefor.

Signed and Sealed this
Twenty-second Day of December, 2020

Andrei Iancu
*Director of the United States Patent and Trademark Office*